United States Patent
Chen et al.

(10) Patent No.: US 11,321,125 B2
(45) Date of Patent: May 3, 2022

(54) TASK PRIORITY PROCESSING METHOD AND PROCESSING DEVICE

(71) Applicant: Alibaba Group Holding Limited, Grand Cayman (KY)

(72) Inventors: Lingjun Chen, Hangzhou (CN); Bin Wang, Hangzhou (CN); Liangliang Zhu, Hangzhou (CN); Xu Zeng, Hangzhou (CN); Zilong Liu, Hangzhou (CN); Junjie Cai, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 122 days.

(21) Appl. No.: 16/726,653

(22) Filed: Dec. 24, 2019

(65) Prior Publication Data

US 2020/0133724 A1 Apr. 30, 2020

Related U.S. Application Data

(63) Continuation of application No. PCT/CN2018/092145, filed on Jun. 21, 2018.

(30) Foreign Application Priority Data

Jun. 27, 2017 (CN) .......................... 201710501881.9

(51) Int. Cl.
  *G06F 9/46* (2006.01)
  *G06F 9/48* (2006.01)
  *G06F 9/52* (2006.01)

(52) U.S. Cl.
  CPC .............. *G06F 9/4881* (2013.01); *G06F 9/46* (2013.01); *G06F 9/526* (2013.01)

(58) Field of Classification Search
  CPC ........... G06F 9/4881; G06F 9/46; G06F 9/526
  See application file for complete search history.

(56) References Cited

U.S. PATENT DOCUMENTS 8,428,076 B2  4/2013 Mansharamani
8,713,573 B2  4/2014 Lee et al.
(Continued)

FOREIGN PATENT DOCUMENTS

CN   101216785 A   7/2008
CN   103699437 A   4/2014
(Continued)

OTHER PUBLICATIONS

Translation of CN Office Action from Corresponding CN Application No. 201710501881.9 dated Feb. 25, 2020, a counterpart foreign application for U.S. Appl. No. 16/726,653, 9 pages.
Translation of CN Office Action from Corresponding CN Application No. 201710501881.9 dated Jun. 4, 2019, a counterpart foreign application for U.S. Appl. No. 16/726,653, 8 pages.
(Continued)

*Primary Examiner* — Camquy Truong
(74) *Attorney, Agent, or Firm* — Lee & Hayes, P.C.

(57) ABSTRACT

In a multitask computing system, there are multiple tasks include a first task, a second task, and a third task, and the first task has a higher priority than that of the second task and the third task. A method including raising the priority of the second task that shares a first critical section with the first task and is accessing the first critical section when the first task is blocked due to failure to access the first critical section; determining whether there is a third task that shares a second critical section with the second task and is accessing the second critical section; and raising, when the third task is present, the priority of the third task. The techniques of the present disclosure prevent a low-priority third task from delaying the execution of a second task, thus avoiding the priority inversion caused by the delayed execution of a high-priority first task.

20 Claims, 4 Drawing Sheets

(56) References Cited

U.S. PATENT DOCUMENTS

| | | | |
|---|---|---|---|
| 8,954,975 B2 | 2/2015 | Kim et al. | |
| 9,207,943 B2 | 12/2015 | Plondke et al. | |
| 9,207,977 B2 | 12/2015 | Easwaran et al. | |
| 9,858,115 B2 | 1/2018 | Chang et al. | |
| 9,886,532 B1* | 2/2018 | Scallon | G06F 30/20 |
| 2008/0288949 A1 | 11/2008 | Bohra et al. | |
| 2009/0271796 A1 | 10/2009 | Kojima | |
| 2010/0122263 A1 | 5/2010 | Didi et al. | |
| 2013/0283279 A1 | 10/2013 | Brandt et al. | |
| 2014/0317380 A1 | 10/2014 | Yamamoto et al. | |
| 2015/0026688 A1* | 1/2015 | Dice | G06F 9/468 |
| | | | 718/102 |
| 2015/0026693 A1* | 1/2015 | Satoh | G06F 9/4881 |
| | | | 718/103 |
| 2017/0206108 A1 | 7/2017 | Dickson | |

FOREIGN PATENT DOCUMENTS

| | | |
|---|---|---|
| CN | 103870330 A | 6/2014 |
| CN | 104636206 A | 5/2015 |

OTHER PUBLICATIONS

Translation of CN Search Report from Corresponding CN Application No. 201710501881.9 dated May 22, 2019, a counterpart foreign application for U.S. Appl. No. 16/726,653, 1 page.
Translation of Written Opinion for corresponding PCT Application PCT/CN2018/092145, dated Dec. 27, 2019, a counterpart foreign application for U.S. Appl. No. 16/726,653, 4 pages.
Translation of Written Opinion for corresponding PCT Application PCT/CN2018/092145, dated Jan. 3, 2019, a counterpart foreign application for U.S. Appl. No. 16/726,653, 2 pages.

\* cited by examiner

RAISE PRIORITY OF SECOND TASK THAT SHARES FIRST CRITICAL SECTION WITH FIRST TASK AND IS ACCESSING FIRST CRITICAL SECTION WHEN FIRST TASK IS BLOCKED DUE TO FAILURE TO ACCESS FIRST CRITICAL SECTION
S102

↓

DETERMINE WHETHER THERE IS THIRD TASK THAT SHARES SECOND CRITICAL SECTION WITH SECOND TASK AND IS ACCESSING SECOND CRITICAL SECTION
S104

↓

RAISE, WHEN THIRD TASK IS PRESENT, PRIORITY OF THIRD TASK
S106

FIG. 1

TASK PRIORITY PROCESSING METHOD AND PROCESSING DEVICE

CROSS REFERENCE TO RELATED PATENT APPLICATIONS

This application claims priority to and is a continuation of PCT Patent Application No. PCT/CN2018/092145, filed on 21 Jun. 2018 and entitled "TASK PRIORITY PROCESSING METHOD AND PROCESSING DEVICE," which claims priority to Chinese Patent Application No. 201710501881.9, filed on 27 Jun. 2017 and entitled "DATA COMMUNICATION METHOD, DEVICE AND APPARATUS, AND STORAGE MEDIUM," which are incorporated herein by reference in their entirety.

TECHNICAL FIELD

The present disclosure relates to the field of computer information processing, and, more particular, to task priority processing methods and processing devices.

BACKGROUND

In a multitask concurrency environment, although multiple tasks are executing at the same time in theory, at a single CPU level, in fact only one task can be executed at any one time. Therefore, the operating system needs to decide which task is to be executed and which task waits, that is, the of the operating system must schedule tasks.

Priority inversion means that, when a high-priority task accesses a shared resource through a semaphore mechanism, the semaphore has already been occupied by a low-priority task, and as a result, the high-priority task is blocked by many tasks with a lower priority which affects real-time performance.

In a multitask system, the following cases of priority inversion may occur:

Suppose there are three tasks with different priorities, namely task1, task2, and task3; task1 has the highest priority, followed by task3, then by task2. Among them, task1 and task2 have a shared critical section, so that there is a mutex, that is, only one of task1 and task2 can access the critical section at one time. During task execution, if task2 has entered the critical section, due to the existence of the mutex, task1 will be blocked before it is awakened and enters the critical section.

Since task1 can only be scheduled after task2 exits from the critical section, while the time when task2 exits from the critical section is unknown, how long task1 would be blocked is also unknown. Thus, the low-priority task3 is scheduled prior to the high-priority task1, thereby causing a priority inversion.

In order to solve this problem, in conventional techniques, a method of priority inheritance is provided. In the above process, the priority of task2 will be raised to be the same as that of task1 when task1 is blocked. Thus, task3 cannot interrupt task2, which ensures smooth execution of high-priority task1 after task2 is executed, and solves the problem of priority inversion in the case of three tasks with a single mutex.

However, if, in this case, task2 and task3 share a critical section and task3 obtains the mutex, task2 will also be blocked and only task3 can be executed. In the process of executing task3, all tasks with a priority higher than that of task3 can interrupt the execution of task3, thereby delaying execution of the high-priority task1.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The example embodiments of the present disclosure provide task priority processing methods and devices to solve the problems existing in conventional techniques.

In order to solve the above problem, an example embodiment of the present disclosure discloses a task priority processing method. The task includes a first task, a second task, and a third task, and the first task has a higher priority than that of the second task and the third task. The method comprises raising the priority of the second task that shares a first critical section with the first task and is accessing the first critical section when the first task is blocked due to failure to access the first critical section; determining whether there is a third task that shares a second critical section with the second task and is accessing the second critical section; and raising, when the third task is present, the priority of the third task.

In order to solve the above problem, an example embodiment of the present disclosure further discloses a task priority processing device. The task includes a first task, a second task, and a third task, and the first task has a higher priority than that of the second task and the third task. The device comprises a first priority changing module configured to raise the priority of the second task that shares a first critical section with the first task and is accessing the first critical section when the first task is blocked due to failure to access the first critical section; a first determining module configured to determine whether there is a third task that shares a second critical section with the second task and is accessing the second critical section; and a second priority changing module configured to raise, when the third task is present, the priority of the third task.

The example embodiments of the present disclosure include at least the following technical advantages.

The present disclosure provides a task priority processing method applied to a multitask operating system. When a first task and a second task in the operating system share a first critical section and the second task shares a second critical section with a third task, in order to avoid priority inversion of tasks that may still be caused in a multitask system by existing priority inheritance methods, the solution provided by the example embodiments of the present disclosure not only raises the priority of the second task that is accessing the critical section at the time when the first task cannot access the first critical section, but also raises the priority of the third task sharing the second critical section with the second task, thereby preventing the low-priority third task from delaying the execution of the second task and avoiding the priority inversion caused by the delayed execution of the high-priority first task.

BRIEF DESCRIPTION OF THE DRAWINGS

In order to more clearly illustrate the technical solutions in the example embodiments of the present disclosure, figures to be used for description of example embodiments and conventional techniques will be introduced briefly hereinafter. Apparently, the figures referred to in the following description merely represent some example embodiments of the present disclosure, and those skilled in the art may also obtain other figures based on these figures without using creative efforts.

FIG. 1 is a flow chart of a task priority processing method according to Example embodiment 1 of the present disclosure.

DETAILED DESCRIPTION

Figure 2:
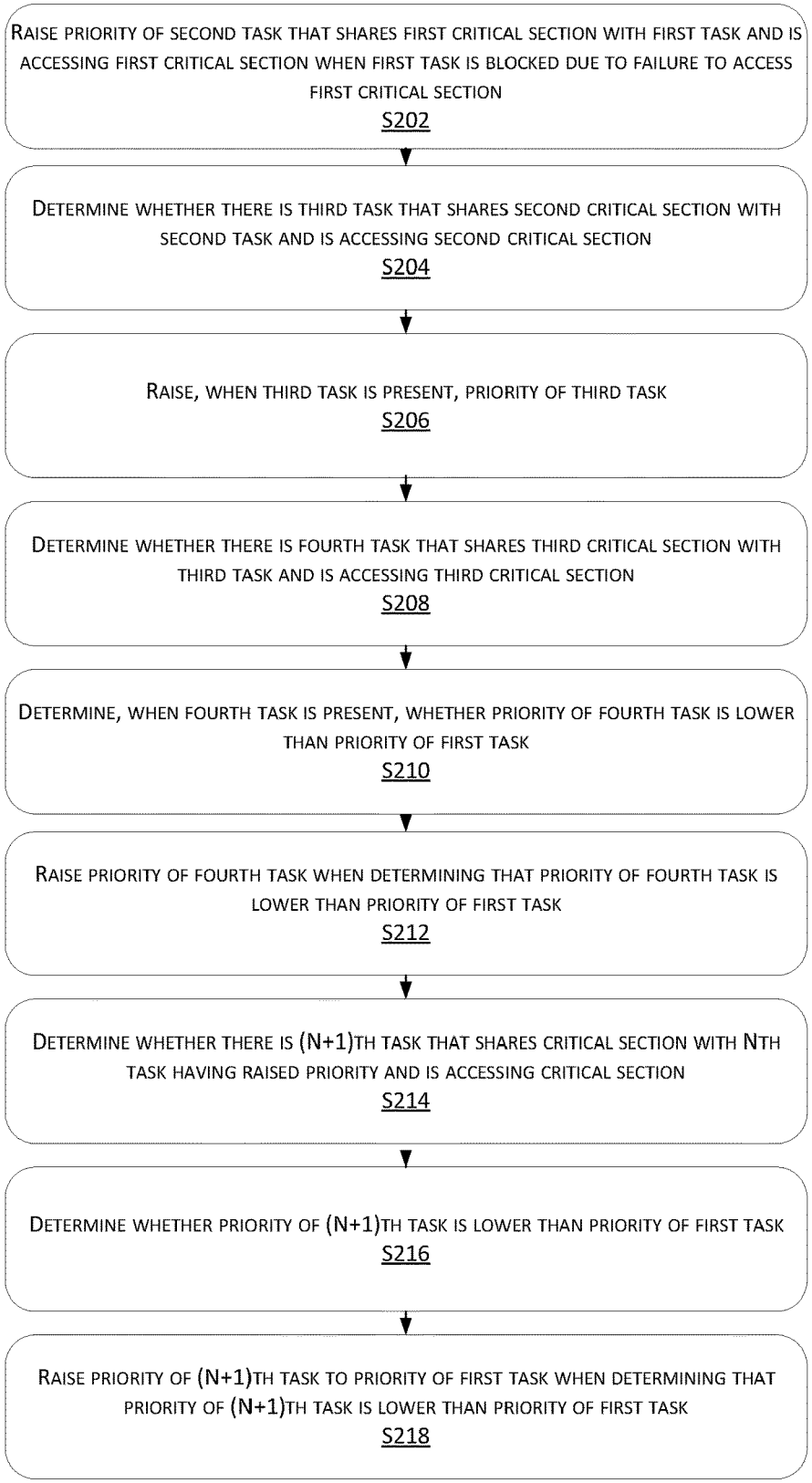
FIG. 2 is a flow chart of a task priority processing method according to Example embodiment 2 of the present disclosure.

The technical solutions in the example embodiments of the present disclosure will be described below in connection with the drawings in the example embodiments of the present disclosure. It is apparent that the example embodiments described herein merely represent a part of, instead of all the example embodiments of, the present disclosure. All other example embodiments obtained by a person of ordinary skill in the art based on the example embodiments in the present disclosure shall fall within the scope of the present disclosure.

The present disclosure provides a task priority processing method, wherein the task includes a first task, a second task, and a third task, and the first task has a higher priority than that of the second task and the third task; and the method comprises: raising the priority of the second task that shares a first critical section with the first task and is accessing the first critical section when the first task is blocked due to failure to access the first critical section; determining whether there is a third task that shares a second critical section with the second task and is accessing the second critical section; and raising, when the third task is present, the priority of the third task. Based on the existing priority inheritance, the solution provided by the example embodiments of the present disclosure not only raise the priority of the second task sharing the critical section with the first task, but also raises the priorities of other tasks (e.g., other tasks sharing the critical section with the second task) that may delay the execution of the second task, thereby avoiding priority inversion caused by the preemptive execution of other tasks with a lower priority than that of the first task and improving the response time of the high-priority first task.

The following is an example of two programs executed in a multi-operating system, which illustrates the substantial defects of the existing priority inheritance problem and the task priority processing method provided by the present disclosure.

Suppose there are task1, task2, and task3, and their priorities are 5, 20, and 25, respectively. A smaller number corresponds to a task with a higher priority. Mutexes involved in the following example are mutex_1 and mutex_2. A mutex is a semaphore that is commonly used to prevent two tasks from accessing the same shared resource at the same time. In the following example, mutex_1 protects the shared resources of task1 and task2, and mutex_2 protects the shared resources of task2 and task3. Each shared resource corresponds to a mutex tag, which is used to ensure that only one task can access the shared resource at any time.

Program 1:

```
void task1( )
{
    mutex_1_get( );        (1)
    /*do something*/       (2)
    mutex_1_free( );       (3)
}
void task2( )
{
    mutex_1_get( );        (4)
    mutex_2_get( );        (5)
    /*do something*/       (6)
    mutex_2_free( );       (7)
    mutex_1_free( );       (8)
}
void task3( )
{
    mutex_2_get( );        (9)
    /*do something*/       (10)
    mutex_2_free( );       (11)
}
```

According to the solution based on the existing priority inheritance, it is assumed that task1 and task2 are in a blocked state of waiting for an event (such as active sleep, waiting for semaphore input, etc.) at the beginning, and the steps of the above program are as follows:

Execute step 1'. task3 is run and gets mutex_2 at (9);

Execute step 2'. When task3 runs to (10), task2 is awakened by the interrupt;

Execute step 3'. Since task2 has a higher priority than that of task3, task2 is run and task3 is suspended;

Execute step 4'. task2 gets mutex_1 at (4);

Execute step 5'. When task2 runs to (5), because mutex_2 is obtained by task3, task2 cannot get mutex_2 and then will be blocked;

Execute step 6'. According to the method of priority inheritance, the priority of task3 is raised from 25 to 20 by task2;

Execute step 7'. When task2 is blocked, assuming that task1 is awakened by the interrupt, task1 starts running;

Execute step 8'. When task1 runs to (1), since task2 gets the mutex mutex_1 at step (4), task1 cannot get mutex_1 in this case and then is blocked;

Execute step 9'. According to the method of priority inheritance, the priority of task2 is raised from 20 to 5 by task1;

Execute step 10'. task2 continues to return to task3 and run to (10).

As shown from the above, the priority of task1 is 5, the priority of task2 is 5, and the priority of task3 is 20. At step 5, task2 is blocked, and at step 8, task1 is blocked, and only task3 can continue execution. When continuing to run at (10), task3 may be easily excessed by any other task with a priority of 5-19. If there is a task4 with a priority of 15, it may interrupt task3 at any time, and when the process then returns to task3 and runs to (11), the waiting time of high-priority task1 and task2 will be very long, which essentially causes the problem of priority inversion.

In order to solve this problem, the present disclosure provides a task priority processing method, which is described in conjunction with the above programs. In the present disclosure, it is assumed that task1 and task2 are in a blocked state of waiting an event at the beginning, and the steps of the above program are as follows:

Execute step 1. task3 is run and gets mutex_2 at (9);

Execute step 2. When task3 runs to (10), task2 is awakened by the interrupt;

Execute step 3. Since task2 has a higher priority than that of task3, task2 is run and task3 is suspended;

Execute step 4. task2 gets mutex_1 at (4);

Execute step 5. When task2 runs to (5), because mutex_2 is obtained by task3, task2 cannot get mutex_ and then will be blocked;

Execute step 6. According to the method of priority inheritance, the priority of task3 is raised from 25 to 20 by task2;

Execute step 7. When task2 is blocked, assuming that task1 is awakened by the interrupt, task1 starts running;

Execute step 8. When task1 runs to (1), since task2 gets the mutex mutex_1 at step (4), task1 cannot get mutex_1 and then is blocked;

Execute step 9. According to the method of priority inheritance, the priority of task2 is raised from 20 to 5 by task1;

Execute step 10. task1 also raises the priority of task3 from 20 to 5;

Execute step 11. task2 continues to return to task3 and run to (10).

As shown from the above, the priority of task1 is 5 in this case, and the priorities of task2 and task3 are also raised to 5. When task3 continues to run at (10), it will not be excessed by any other task with priority 5-19. After task3 is finished, the mutex_2 is released and the task2 is further executed; and after task2 is executed, the mutex_1 is released and task1 is executed. Therefore, task1 with a high priority is executed smoothly without being excessed by a task with a low priority.

Program 2:

```
void task1( )
{
  mutex_1_get( )    (1)
  mutex_1_free( )   (2)
}
void task2( )
{
  mutex_1_get( )    (3)
  mutex_1_free( )   (4)
}
void task3( )
{
  mutex_1_get( )    (5)
  /* do something */ (6)
  mutex_1_free( )   (7)
}
```

According to the solution provided by conventional techniques, it is assumed that the priority of task1 is 5, the priority of task2 is 20 and the priority of task3 is 25 and that task1 and task2 are in a blocked state of waiting for an event (such as active sleep, waiting for semaphore input, etc.) at the beginning, and the steps of the above program are as follows:

Execute step 1'. task3 gets mutex_1; Execute step 2'. When task3 runs to (6), task2 is awakened by the interrupt, task2 is run and task 3 is suspended;

Execute step 3'. When task2 runs to (3), task2 cannot get mutex_1 and thus is blocked. In this case, the priority of task3 is raised from 25 to 20, the same as the priority of task2, and then task2 falls in sleep;

Execute step 4'. When task3 continues to run to (6), assume that task1 is awakened to run;

Execute step 5'. Since task1 cannot get mutex_1, task1 is blocked, and the priority of task3 is raised from 20 to 5, the same as the priority of task1;

Execute step 6'. task1 falls in sleep and the process return to task3;

Execute step 7'. task3 is unlocked at (7), and task2 is awakened to run, and in this case, the priority of task3 is restored to the initial value of 25.

It can be seen from the above that since task3 has a relatively low priority at this time, in the process of task3 running in step 6, any task with a higher priority than that of task3 can occupy the task if its priority is lower than the priorities of task1 and task2; if there is a task4 having a higher priority than that of task3, it may interrupt the running of task3 at any time, and when the process then returns to task3 and runs to (7), the waiting time of task1 and task2 will be very long, which also causes the problem of priority inversion.

In order to solve this problem, the present disclosure provides a task priority processing method, which is described in conjunction with the above programs. In the present disclosure, it is assumed that task1 and task2 are in a blocked state of waiting an event at the beginning, and the steps of the above program are as follows:

Execute step 1. task3 gets mutex_1;

Execute step 2. When task3 runs to (6), task2 is awakened and resources are preempted by task2;

Execute step 3. When task2 runs to (3), task2 cannot get mutex_1 and thus is blocked, and in this case, the priority of task3 is raised to the priority of task2, and then task2 falls in sleep;

Execute step 4. When task3 continues to run to (6), task1 is awakened to run;

Execute step 5. Since task1 cannot get mutex_1, task1 is blocked, and in this case, task1 raises task2 to the same priority as that of task1;

Execute step 6. task1 raises task3 to the same priority as that of task1 at the same time;

Execute step 7. task1 falls in sleep and the process returns to task3;

Execute step 8. task3 is unlocked at (7), and then task2 is awakened to run.

It can be seen from the above that in the process of task3 running in step 8, since task3 has been raised to the same priority as that of task1, other tasks having a priority lower than 5 will not interrupt the running of task3 in the process of task3 running at (6), so that the mutex_1 is released after the end of task3, and task2 and task1 are further executed to ensure that the high-priority task1 is executed smoothly and will not be excessed by a low-priority task.

The task priority processing method and processing device provided by the present disclosure will be described below by way of specific example embodiments.

Example Embodiment 1

Example embodiment 1 of the present disclosure provides a task priority processing method. FIG. 1 is a step flow chart of a task priority processing method according to Example embodiment 1 of the present disclosure.

As shown in FIG. 1, the example embodiment of the present disclosure provides a task priority processing method, wherein the task includes a first task, a second task, and a third task, and the first task has a higher priority than that of the second task and the third task; and the method comprises the following steps:

S102, raise the priority of the second task that shares a first critical section with the first task and is accessing the first critical section when the first task is blocked due to failure to access the first critical section;

in this step, referring to the execution step 9 of the above-described program 1 and the execution step 5 of the above-described program 2, according to the priority inheritance method, the second task may be raised to the same priority as that of the first task when the following conditions are reached:

1. the priority of the second task is lower than that of the first task; and 2. at this time, the critical section of the first task and the second task is accessed by the second task, that is, the second task gets a mutex for protecting the critical section (shared resource), so that the current first task cannot be obtained.

In this step, when the first task is blocked due to failure to access the first critical section, the first task raises the priority of the second task currently accessing the first critical section.

For example, the priority of the second task described above may be raised to be the same as the priority of the first task. For another example, the priority of the second task described above may also be raised to be second only to the priority of the first task or raised to be higher than the priorities of other tasks, and the present disclosure is not limited thereto.

In practice, tasks and corresponding priorities may be set at an interface for task creation. Further, the program may include, for example, the following statement to raise the priority of the second task to the priority of the first task:

```
if (g_active_task->prio < mutex_task->prio) {
    task_pri_change(mutex_task, g_active_task->prio);
    TRACE_TASK_PRI_INV(g_active_task, mutex_task);
}
pend_to_blk_obj ((blk_obj_t *)mutex, g_active_task, ticks);
from the statement, if (g_active_task->prio <
mutex_task->prio) {
    task_pri_change(mutex_task, g_active_task->prio), it can be
seen that if the priority of the current task is higher than the priority of the
task that gets the mutex, the program task_pri_change (mutex_task,
g_active_task->prio) is called to change the priority of the task to the
priority of the current task. The function task_pri_change will raise the
priority of the counterpart.
```

S104, determine whether there is a third task that shares a second critical section with the second task and is accessing the second critical section.

S106, raise the priority of the third task when the third task is present.

In the above two steps, referring to the execution step 10 of the above-mentioned program 1 and the execution step 6 of the above-mentioned program 2, compared with conventional techniques, the improvement proposed by the example embodiment of the present disclosure not only raises the priority of the task2 but also raises the priority of task3 related to task2, thereby avoiding the problem that task1 cannot be executed timely because the task3 delays the execution time of task2.

In the example embodiment of the present invention, the following code may be included in the task_pri_change for finding the task3 in the step S104 and raising the priority of the task3:

```
case K_PEND:
    case K_PEND_SUSPENDED:
        old_pri = task->prio;
        task->prio = new_pri;
        pend_list_reorder(task);
        if (task->blk_obj->obj_type == YUNOS_MUTEX_OBJ_TYPE) {
            mutex_tmp = (kmutex_t *)(task->blk_obj);
            mutex_task = mutex_tmp->mutex_task;
            if (mutex_task->prio > task->prio) 1
                task = mutex_task;
```

In the above code, if task1 finds that task2 is in a blocked state, the priority of task2 is first changed to be the same as the priority of task1, and then if it is determined that task2 is blocked on the mutex of task3 (i.e., the current task3 is accessing the second critical section, causing task2 to fail to access the second critical section), task3 will be obtained through the blocked mutex_2, as follows:

mutex tmp=(kmutex_t*)(task−>blk_obj); mutex task=mutex_tmp_−>mutex_task;

Thereafter, if the priority of task3 is lower than the priority of task1, as in step S106, the priority of task3 is raised:

if (mutex task−>prio>task−>prio){ task=mutex_task;

For example, in this example embodiment, the case affecting the execution of task2 includes: when task2 cannot get the mutex because task3 and task2 share the second critical section and task3 is accessing the second critical section (i.e., task3 gets a mutex), only after task3 is executed and releases the mutex, task2 can be executed, and then task1 can be executed. Therefore, in order to ensure that the execution of task1 is not interrupted by other tasks with a lower priority than that of task1 during the execution of task3, the priority of task3 is raised to be the same as the priority of task1 in the above step S106.

For example, the priority of the third task described above may be raised to be the same as the priority of the first task. In other example embodiments, the priority of the third task described above may also be raised to be second only to the priority of the first task or raised to be higher than the priorities of other tasks, and the present disclosure is not limited thereto.

It can be seen from the above that the task priority processing method provided by Example embodiment 1 of the present disclosure at least has the following technical effects:

The present invention provides a task priority processing method, applied to a multitask operating system. When a first task and a second task in the operating system share a first critical section and the second task shares a second critical section with a third task, in order to avoid priority inversion of tasks that may still be caused in a multitask system by existing priority inheritance methods, the solution provided by the example embodiment of the present invention not only raises the priority of the second task that is accessing the critical section at the time when the first task cannot access the first critical section, but also raises the priority of the third task sharing the second critical section with the second task, thereby preventing the low-priority third task from delaying the execution of the second task and thus avoiding the priority inversion caused by the delayed execution of the high-priority first task. Compared with conventional techniques, the example embodiment of the present invention improves existing priority inheritance methods, solves the problem of priority inversion, and further solves the problem of poor system real-time performance because the high-priority task waits a very long time for a mutex of a low-priority task. The method provided by the present disclosure improves the system practicability and has an important application value in various fields, especially in industrial, voice, aerospace, and military fields.

Example embodiment 2

Example embodiment 2 of the present disclosure provides a task priority processing method. FIG. 2 is a step flow chart of a task priority processing method according to Example embodiment 2 of the present disclosure. As shown in FIG. 2, the example embodiment of the present disclosure provides a task priority processing method, wherein the task includes a first task, a second task, and a third task, and the first task has a higher priority than that of the second task and the third task; and the method comprises the following steps:

S202, raise the priority of the second task that shares a first critical section with the first task and is accessing the first critical section when the first task is blocked due to failure to access the first critical section;

S204, determine whether there is a third task that shares a second critical section with the second task and is accessing the second critical section; and S206, the priority of the third task is raised when the third task is present.

The above steps S202 to S206 are the same as or similar to the steps S102 to S106 of the previous example embodiment and are not elaborated herein again. This example embodiment focuses on the differences from the previous example embodiment.

In this example embodiment, similar to step S102, in step S202, the priority of the second task may be raised to be the same as the priority of the first task, or may be, for example, second only to the priority of the first task, which will not be elaborated here.

In step S206, similar to step S206, the priority of the third task may be raised to be the same as the priority of the first task, or may be, for example, second only to the priority of the first task, which will not be elaborated here.

In this example embodiment, the first critical section and the second critical section may be the same critical section or may be different critical sections.

For the case of the same critical section, reference can be made to the above program 2, where task1, task2, and task3 share a critical section, and mutex_1 needs to be obtained before entering the critical section. When one of the tasks gets the mutex_1 and accesses the critical section, the remaining tasks cannot access the critical section.

For the case of different critical sections, reference may be made to the above program 1, where task1 and task2 share a first critical section which is protected by mutex_1; task2 and task3 share a second critical section which is protected by mutex_2. For each critical section, when one of the tasks gets mutex_1 and accesses the critical section, the other cannot access the critical section.

In an example embodiment, tasks involved in the above-mentioned task priority processing method may be not limited to three tasks. For example, a fourth task, a fifth task, . . . an Nth task, and the like may be included.

After the priority of the third task is raised, the method may further comprise:

S208, whether there is a fourth task that shares a third critical section with the third task and is accessing the third critical section is determined;

S210, when the fourth task is present, whether the priority of the fourth task is lower than the priority of the first task is determined;

S212, when the priority of the fourth task is determined to be lower than the priority of the first task, the priority of the fourth task is raised.

In this step, whether there is a fourth task sharing a third critical section with the third task is determined in the same manner as described above, when the fourth task is present and the priority of the fourth task is lower than the priority of the first task, the priority of the fourth task may be raised, for example, to be the same as the priority of the first task.

For example, in step S212, that is, when it is determined that the priority of the fourth task is lower than the priority of the first task, after the priority of the fourth task is raised, the method may further comprise:

S214, whether there is an (N+1)th task that shares a critical section with an Nth task having a raised priority and is accessing the critical section is determined;

S216, when the (N+1)th task is present, whether the priority of the (N+1)th task is lower than the priority of the first task is determined; and S218, when it is determined that the priority of the (N+1)th task is lower than the priority of the first task, the priority of the (N+1)th task is raised to the priority of the first task, where N is a positive integer greater than or equal to 4.

In the above steps, assume that N is 4, and after the priority of the fourth task is raised, whether there is a fifth task that shares a critical section with the fourth task is determined. When the fifth task is present and the priority of the fifth task is lower than the priority of the first task, the priority of the fifth task may be raised, for example, to be the same as the priority of the first task. Thereby, it can be ensured that when more than three tasks are to be executed, the priority of each task related to the third task is raised, and a low-priority task is prevented from delaying the execution of a high-priority task. The above-mentioned "task related to the third task" refers to a task that needs to be executed before the third task, otherwise the third task cannot be executed.

The task priority processing method provided by the present disclosure at least has the following technical advantages.

The present disclosure provides a task priority processing method, applied to a multitask operating system. When a first task and a second task in the operating system share a first critical section and the second task shares a second critical section with a third task, in order to avoid priority inversion of tasks that may still be caused in a multitask system by the existing priority inheritance methods, the solution provided by the example embodiment of the present disclosure not only raises the priority of the second task that is accessing the critical section at the time when the first task cannot access the first critical section, but also raises the priority of the third task sharing the second critical section with the second task, thereby preventing the low-priority third task from delaying the execution of the second task and thus avoiding the priority inversion caused by the delayed execution of the high-priority first task.

In addition, the task priority processing method provided by the example embodiment at least has the following technical advantages.

The example embodiment of the present disclosure provides a task priority processing method, applied to a multitask operating system. In the case where there are more than three tasks in the operating system, the solution provided by the example embodiment of the present disclosure not only raises the priority of the second task that is accessing the critical section at the time when the first task cannot access the first critical section, but also raises the priority of the third task sharing the second critical section with the second task, as well as the priorities of the fourth task, the fifth task, . . . , the (N+1)th task that share a critical section with the third task, thereby preventing the low-priority tasks from delaying the execution of the second task directly or indirectly and thus avoiding the priority inversion caused by the delayed execution of the high-priority first task. Compared with conventional techniques, the example embodiment of the present disclosure improves existing priority inheritance methods, solves the problem of priority inversion, and further solves the problem of delayed response of high-priority tasks caused by a very long waiting time.

Example Embodiment 3

Figure 3:
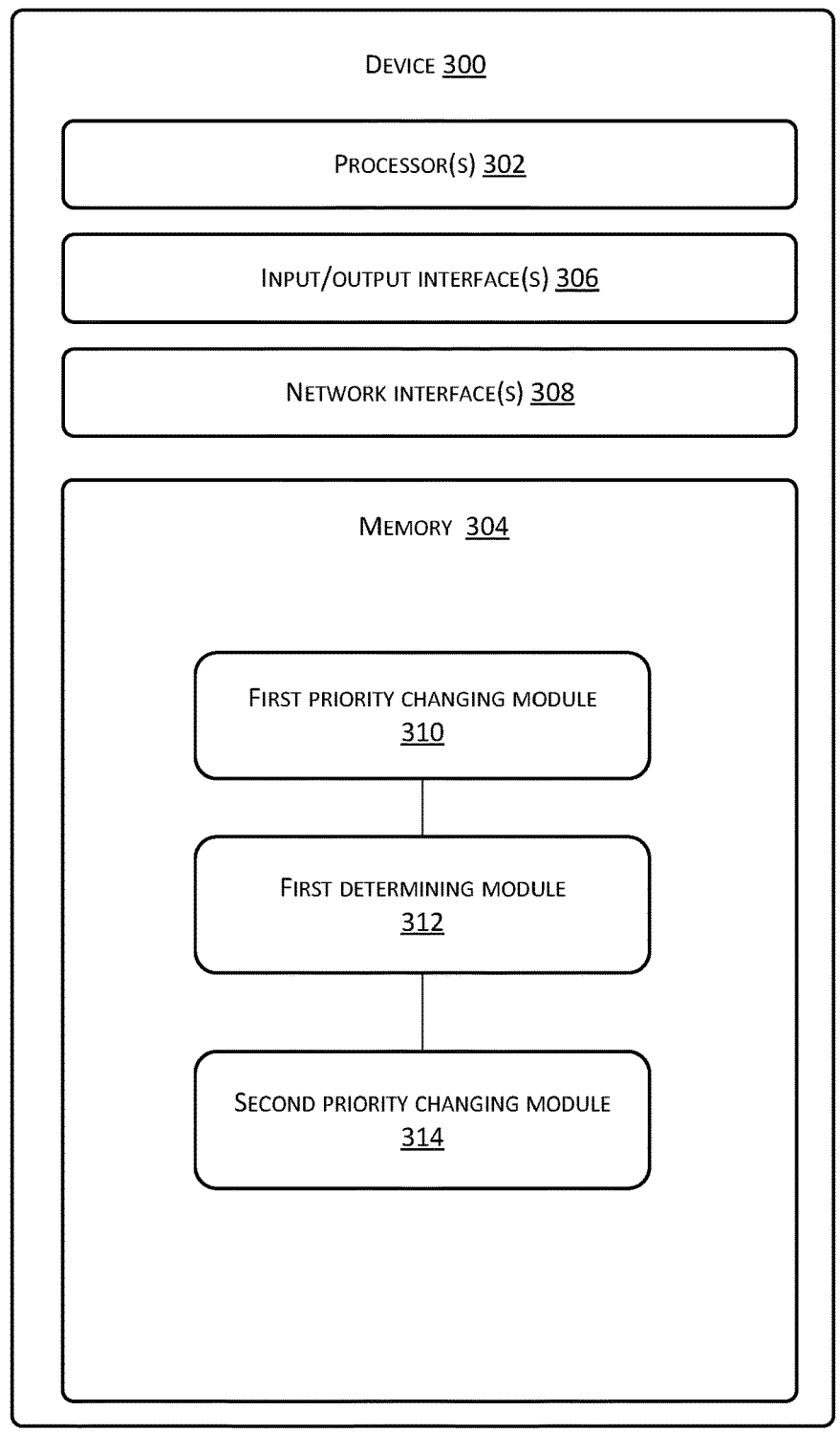
FIG. 3 is a block diagram of a task priority processing device according to Example embodiment 3 of the present disclosure.

Example embodiment 3 of the present disclosure provides a task priority processing device. FIG. 3 is a block diagram of a task priority processing device according to Example embodiment 3 of the present disclosure. The tasks include a first task, a second task, and a third task, and the first task has a higher priority than that of the second task and the third task. As shown in FIG. 3, a device 300 includes one or more processor(s) 302 or data processing unit(s) and memory 304. The device 300 may further include one or more input/output interface(s) 306 and one or more network interface(s) 308. The memory 304 is an example of computer readable medium or media.

The memory 304 may store therein a plurality of modules or units a first priority changing module 310, a first determining module 312, and a second priority changing module 314.

The first priority changing module 310 is configured to raise the priority of the second task that shares a first critical section with the first task and is accessing the first critical section when the first task is blocked due to failure to access the first critical section.

Referring to the execution step 9 of the above-described program 1 and the execution step 5 of the above-described program 2, according to the priority inheritance method, the second task may be raised to the same priority as that of the first task when the following conditions are reached:

1. the priority of the second task is lower than that of the first task; and 2. at this time, the critical section of the first task and the second task is accessed by the second task, that is, the second task gets a mutex for protecting the critical section (shared resource), so that the current first task cannot be obtained.

In this module, when the first task is blocked due to failure to access the first critical section, the first task raises the priority of the second task currently accessing the first critical section.

For example, the priority of the second task described above may be raised to be the same as the priority of the first task. In other example embodiments, the priority of the second task described above may be raised to be second only to the priority of the first task or raised to be higher than the priorities of other tasks, and the present disclosure is not limited thereto.

The first determining module 312 is configured to determine whether there is a third task that shares a second critical section with the second task and is accessing the second critical section.

The second priority changing module 314 is configured to raise, when the third task is present, the priority of the third task.

In the above two modules, referring to the execution step 10 of the above-mentioned program 1 and the execution step 6 of the above-mentioned program 2, compared with conventional techniques, the improvement proposed by the example embodiment of the present disclosure not only raises the priority of the task2 but also raises the priority of task3 related to task2, thereby avoiding the problem that task1 cannot be executed timely because the task3 delays the execution time of task2.

In the example embodiment of the present invention, the following code may be included in the task_pri_change for finding the task3 in the step S104 and raising the priority of the task3.

For example, the priority of the third task described above may be raised to be the same as the priority of the first task. In other example embodiments, the priority of the third task described above may also be raised to be second only to the priority of the first task or raised to be higher than the priorities of other tasks, and the present disclosure is not limited thereto.

The task priority processing method provided by the example embodiment has the following technical advantages.

The present invention provides a task priority processing device, applied to a multitask operating system. When a first task and a second task in the operating system share a first critical section and the second task shares a second critical section with a third task, in order to avoid priority inversion of tasks that may still be caused in a multitask system by existing priority inheritance methods, the solution provided by the example embodiment of the present invention not only raises the priority of the second task that is accessing the critical section at the time when the first task cannot access the first critical section, but also raises the priority of the third task sharing the second critical section with the second task, thereby preventing the low-priority third task from delaying the execution of the second task and thus avoiding the priority inversion caused by the delayed execution of the high-priority first task.

Compared with conventional techniques, the example embodiment of the present invention improves existing priority inheritance methods, solves the problem of priority inversion, and further solves the problem of poor system real-time performance because the high-priority task waits a very long time for a mutex of a low-priority task. The priority processing device provided by the present disclosure improves the system practicability and has an important application value in various fields, especially in industrial, voice, aerospace, and military fields.

Example Embodiment 4

Figure 4:
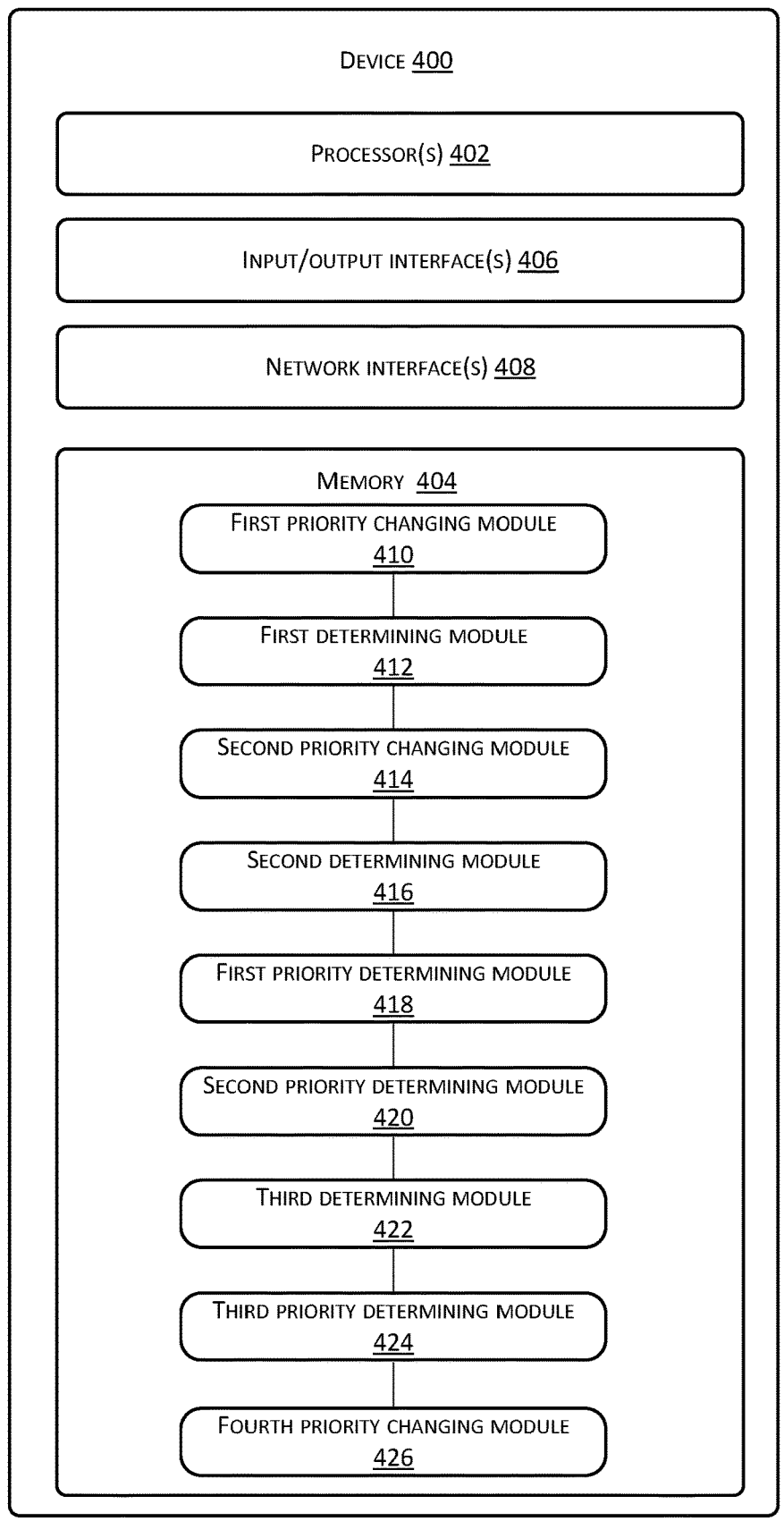
FIG. 4 is a block diagram of a task priority processing device according to Example embodiment 4 of the present disclosure.

Example embodiment 4 of the present disclosure provides a task priority processing device. FIG. 4 is a block diagram of a task priority processing device according to Example embodiment 4 of the present disclosure. The task includes a first task, a second task, and a third task, and the first task has a higher priority than that of the second task and the third task. As shown in FIG. 4, a device 400 includes one or more processor(s) 402 or data processing unit(s) and memory 404.

The device 400 may further include one or more input/output interface(s) 406 and one or more network interface(s) 408. The memory 404 is an example of computer readable medium or media.

The memory 404 may store therein a plurality of modules or units a first priority changing module 410, a first determining module 412, and a second priority changing module 414.

The first priority changing module 410 configured to raise the priority of the second task that shares a first critical section with the first task and is accessing the first critical section when the first task is blocked due to failure to access the first critical section.

The first determining module 412 is configured to determine whether there is a third task that shares a second critical section with the second task and is accessing the second critical section.

The second priority changing module 414 is configured to raise, when the third task is present, the priority of the third task.

The modules 410-414 are the same as or similar to the modules 310-314 of the previous example embodiment and are not elaborated herein again. For related content, reference may be made to the descriptions of the modules 310-314.

For example, the first critical section and the second critical section are the same critical section or different critical sections.

For example, in the raising the priority of the second task that shares a first critical section with the first task and is accessing the first critical section, the priority of the second task is raised to be the same as the priority of the first task; and/or in the raising the priority of the third task, the priority of the third task is raised to be the same as the priority of the first task.

For example, the device 400 may further comprise the following module stored in the memory 404:

a second determining module 416 configured to determine whether there is a fourth task that shares a third critical section with the third task and is accessing the third critical section;

a first priority determining module 418 configured to determine, when the fourth task is present, whether the priority of the fourth task is lower than the priority of the first task; and a second priority determining module 420 configured to raise the priority of the fourth task when it is determined that the priority of the fourth task is lower than the priority of the first task.

For example, the device 400 may further comprise the following module stored in the memory 404:

a third determining module 422 configured to determine whether there is an (N+1)th task that shares a critical section with an Nth task having a raised priority and is accessing the critical section;

a third priority determining module 424 configured to determine, when the (N+1)th task is present, whether the priority of the (N+1)th task is lower than the priority of the first task; and a fourth priority changing module 426 configured to raise the priority of the (N+1)th task when it is determined that the priority of the (N+1)th task is lower than the priority of the first task.

The task priority processing device provided by the example embodiment has the following technical advantages.

The present disclosure provides a task priority processing device, applied to a multitask operating system. When a first task and a second task in the operating system share a first critical section and the second task shares a second critical section with a third task, in order to avoid priority inversion of tasks that may still be caused in a multitask system by existing priority inheritance methods, the solution provided by the example embodiment of the present disclosure not only raises the priority of the second task that is accessing the critical section at the time when the first task cannot access the first critical section, but also raises the third task sharing the second critical section with the second task, thereby preventing the low-priority third task from delaying the execution of the second task and thus avoiding the priority inversion caused by the delayed execution of the high-priority first task.

In addition, the task priority processing device provided by the example embodiment at least has the following technical advantages.

The example embodiment of the present disclosure provides a task priority processing device, applied to a multitask operating system. In the case where there are more than three tasks in the operating system, the solution provided by the example embodiment of the present disclosure not only raises the priority of the second task that is accessing the critical section at the time when the first task cannot access the first critical section, but also raises the priority of the third task sharing the second critical section with the second task, as well as the priorities of the fourth task, the fifth task, . . . , the (N+1)th task that share a critical section with the third task, thereby preventing the low-priority tasks from delaying the execution of the second task directly or indirectly and thus avoiding the priority inversion caused by the delayed execution of the high-priority first task. Compared with conventional techniques, the example embodiment of the present disclosure improves existing priority inheritance methods, solves the problem of priority inversion, and further solves the problem of delayed response of high-priority tasks caused by a very long waiting time.

The example embodiments of the present disclosure further provide an electronic apparatus for task priority processing, wherein the task includes a first task, a second task, and a third task, and the first task has a higher priority than that of the second task and the third task; and the electronic apparatus comprises:

a memory for storing computer readable programs; and a processor, wherein the electronic apparatus performs the following operations when the processor reads the computer readable programs in the memory:

raising the priority of the second task that shares a first critical section with the first task and is accessing the first critical section when the first task is blocked due to failure to access the first critical section;

determining whether there is a third task that shares a second critical section with the second task and is accessing the second critical section; and raising, when the third task is present, the priority of the third task.

For device or apparatus example embodiments, since they are basically similar to the method example embodiments, they are described in a brief way, and part of the description of the method example embodiments may be referred to for the relevant parts.

The various example embodiments in the present disclosure are described in a progressive manner, and each example embodiment focuses on differences from other example embodiments, and the same and similar parts between the various example embodiments can be referred to each other.

Those skilled in the art should understand that the example embodiments of the present disclosure may be provided as a method, a device, or a computer program product. Accordingly, the example embodiments of the present disclosure may take the form of an entirely hardware example embodiment, an entirely software example embodiment, or an example embodiment combining software and hardware. Moreover, the example embodiments of the present disclosure may take the form of a computer program product implemented on one or more computer usable storage media (including, but not limited to, disk memories, CD-ROMs, optical memories, etc.) comprising computer usable program codes.

In a typical configuration, the computer device includes one or more processors (CPUs), input/output interfaces, network interfaces, and memories. The memory may be in a form of a non-permanent memory, a random-access memory (RAM), and/or a nonvolatile memory, such as a read-only memory (ROM) or a flash RAM, in computer readable media. The memory is an example of computer readable media. Computer readable media include both permanent and non-permanent, removable and non-removable media and may store information by any method or technology. The information may be a computer readable instruction, a data structure, a module of a program or other data. Examples of computer storage media include, but are not limited to, a phase change memory (PRAM), a static random access memory (SRAM), a dynamic random access memory (DRAM), other types of random access memories (RAMs), a read only memory (ROM), an electrically erasable programmable read-only memory (EEPROM), a flash memory or other memory technologies, a compact disk read-only memory (CD-ROM), a digital versatile disc (DVD) or other optical storage devices, a tape cassette, a magnetic tape/magnetic disk storage or other magnetic storage devices or any other non-transmission medium, and may be used for storing information accessible by computing devices. As defined herein, the computer readable media do not include transitory media, such as modulated data signals and carriers.

The example embodiments of the present disclosure are described with reference to the flowcharts and/or the block diagrams of the methods, terminal devices (systems), and computer program products according to the example embodiments of the present disclosure. It should be understood that each process and/or block in the flowcharts and/or block diagrams, and combinations of the processes and/or blocks in the flowcharts and/or the block diagrams, may be implemented by computer-readable instructions. These computer-readable instructions may be provided to a processor of a general-purpose computer, a special-purpose computer, an embedded processor, or other programmable data processing terminal devices to produce a machine such that instructions are executed by the processor of the computer or other programmable data processing terminal devices to generate an device for implementing the functions specified in one or more processes in the flowcharts and/or one or more blocks in the block diagrams.

These computer-readable instructions may also be stored in a computer readable memory that may direct a computer or other programmable data processing devices to function in a particular manner such that the instructions stored in the computer readable memory produce an article of manufacture including an instruction means which implements functions specified in one or more processes in the flowcharts and/or one or more blocks in the block diagrams.

These computer-readable instructions may also be loaded onto a computer or other programmable data processing terminal devices to cause a series of operating steps to be performed on the computer or other programmable devices to produce computer-implemented processing, and the instructions executed on a computer or other programmable terminal devices provide steps for implementing the functions specified in one or more processes in the flowcharts and/or one or more blocks in the block diagrams.

Although the example embodiments of the present disclosure have been described, those skilled in the art may make other changes and modifications to these example embodiments once they have acquired the basic inventive concept. Therefore, the appended claims are intended to be interpreted as including the example embodiments and all the changes and modifications that fall within the scope of the example embodiments of the present disclosure.

At last, it further should be noted that, in this context, relational terms such as "first" and "second" are only used to distinguish an entity or an operation from another entity or operation without necessarily requiring or implying that there is any such actual relationship or sequence among such entities or operations. Moreover, the term "comprising," "including" or any of other variants thereof is intended to cover non-exclusive inclusions such that a process, method, article, or terminal device that includes a series of elements not only includes those elements but also includes other elements that are listed explicitly, or also includes inherent elements of this process, method, item, or terminal device. In the absence of more limitations, an element defined by the sentence "including a/an . . . " does not exclude that the process, method, article or device including the element further has other identical elements.

The task priority processing method and processing device provided by the present disclosure have been described above in detail. Specific examples are used herein to describe the principle and implementations of the present disclosure. The above description of the example embodiments is only used to help understand the method of the present disclosure and its core concept. Moreover, for those skilled in the art, based on the concept of the present disclosure, there will be changes in the specific example embodiments and application scope. In summary, the content of the present disclosure should not be understood as being intended to limit the present disclosure.

The present disclosure may further be understood with clauses as follows.

Clause 1. A task priority processing method, the task comprising a first task, a second task, and a third task, the first task having a higher priority than that of the second task and the third task, wherein the method comprises:

raising the priority of the second task that shares a first critical section with the first task and is accessing the first critical section when the first task is blocked due to failure to access the first critical section;

determining whether there is a third task that shares a second critical section with the second task and is accessing the second critical section; and raising, when the third task is present, the priority of the third task.

Clause 2. The method of clause 1, wherein the raising the priority of the second task that shares a first critical section with the first task and is accessing the first critical section comprises: raising the priority of the second task to the priority of the first task.

Clause 3. The method of clause 1, wherein the raising the priority of the third task comprises: raising the priority of the third task to the priority of the first task.

Clause 4. The method of clause 1, wherein the first critical section and the second critical section are the same critical section.

Clause 5. The method of clause 1, wherein the first critical section and the second critical section are different critical sections.

Clause 6. The method of clause 1, wherein after the raising, when the third task is present, the priority of the third task, the method further comprises:

determining whether there is a fourth task that shares a third critical section with the third task and is accessing the third critical section;

determining, when the fourth task is present, whether the priority of the fourth task is lower than the priority of the first task; and raising the priority of the fourth task when determining that the priority of the fourth task is lower than the priority of the first task.

Clause 7. The method of clause 6, wherein the raising the priority of the fourth task comprises: raising the priority of the fourth task to the priority of the first task.

Clause 8. The method of clause 6, wherein after the raising the priority of the fourth task when determining that the priority of the fourth task is lower than the priority of the first task, the method further comprises:

determining whether there is an (N+1)th task that shares a critical section with an Nth task having a raised priority and is accessing the critical section;

determining, when the (N+1)th task is present, whether the priority of the (N+1)th task is lower than the priority of the first task; and raising the priority of the (N+1)th task when determining that the priority of the (N+1)th task is lower than the priority of the first task, where N is a positive integer greater than or equal to 4.

Clause 9. The method of clause 8, wherein the raising the priority of the (N+1)th task comprises: raising the priority of the (N+1)th task to the priority of the first task.

Clause 10. A task priority processing device, the task comprising a first task, a second task, and a third task, the first task having a higher priority than that of the second task and the third task, wherein the device comprises:

a first priority changing module configured to raise the priority of the second task sharing a first critical section with the first task to the priority of the first task when the first task is blocked due to failure to access the first critical section;

a first determining module configured to determine whether there is a third task that shares a second critical section with the second task and is accessing the second critical section; and a second priority changing module configured to raise, when the third task is present, the priority of the third task.

Clause 11. The device of clause 10, wherein the raising the priority of the second task that shares a first critical section with the first task and is accessing the first critical section comprises: raising the priority of the second task to the priority of the first task.

Clause 12. The device of clause 10, wherein the raising the priority of the third task comprises: raising the priority of the third task to the priority of the first task.

Clause 13. The device of clause 10, wherein the first critical section and the second critical section are the same critical section.

Clause 14. The device of clause 10, wherein the first critical section and the second critical section are different critical sections.

Clause 15. The device of clause 10, further comprising:

a first determining module configured to determine whether there is a fourth task that shares a third critical section with the third task and is accessing the third critical section;

a first priority determining module configured to determine, when the fourth task is present, whether the priority of the fourth task is lower than the priority of the first task; and a third priority changing module configured to raise the priority of the fourth task when it is determined that the priority of the fourth task is lower than the priority of the first task.

Clause 16. The device of clause 15, wherein the raising the priority of the fourth task comprises: raising the priority of the fourth task to the priority of the first task.

Clause 17. The device of clause 15, further comprising:

a second determining module configured to determine whether there is an (N+1)th task that shares a critical section with an Nth task having a raised priority and is accessing the critical section;

a second priority determining module configured to determine, when the (N+1)th task is present, whether the priority of the (N+1)th task is lower than the priority of the first task; and a fourth priority changing module configured to raise the priority of the (N+1)th task when it is determined that the priority of the (N+1)th task is lower than the priority of the first task, where N is a positive integer greater than or equal to 4.

Clause 18. The device of clause 17, wherein the raising the priority of the (N+1)th task comprises: raising the priority of the (N+1)th task to the priority of the first task.

Clause 19. An electronic apparatus for task priority processing, the task comprising a first task, a second task, and a third task, the first task having a higher priority than that of the second task and the third task, wherein the electronic apparatus comprises:

a memory for storing computer readable programs; and a processor, wherein the electronic apparatus performs the following operations when the processor reads the computer readable programs in the memory:

raising the priority of the second task that shares a first critical section with the first task and is accessing the first critical section when the first task is blocked due to failure to access the first critical section;

determining whether there is a third task that shares a second critical section with the second task and is accessing the second critical section; and raising, when the third task is present, the priority of the third task.

What is claimed is:

1. A method comprising:

determining that a first task is blocked due to failure to access a first critical section in a multitask computing system;

raising a priority of a second task that shares the first critical section with the first task and is accessing the first critical section up to a priority of the first task, the first task having a higher priority than that of the second task and a third task, the second task having a higher priority than that of the third task;

determining that the third task is accessing a second critical section which is shared with the second task; and raising a priority of the third task up to the priority of the first task.

2. The method of claim 1, wherein the raising the priority of the second task comprises raising the priority of the second task to the priority of the first task.

3. The method of claim 1, wherein the raising the priority of the second task comprises raising the priority of the second task to a priority only lower than the priority of the first task.

4. The method of claim 1, wherein the raising the priority of the second task comprises raising the priority of the second task to be higher than the priority of the third task.

5. The method of claim 1, wherein the raising the priority of the third task comprises raising the priority of the third task to the priority of the first task.

6. The method of claim 1, wherein the first critical section and the second critical section are the same critical section.

7. The method of claim 1, wherein the first critical section and the second critical section are different critical sections.

8. The method of claim 1, wherein after the raising the priority of the third task, the method further comprises:
   determining that there is a fourth task that shares a third critical section with the third task and is accessing the third critical section;
   determining that a priority of the fourth task is lower than the priority of the first task; and
   raising the priority of the fourth task.

9. The method of claim 8, wherein the raising the priority of the fourth task comprises raising the priority of the fourth task to the priority of the first task.

10. The method of claim 8, wherein after the raising the priority of the fourth task, the method further comprises:
    determining that there is an (N+1)th task that shares a critical section with an Nth task having a raised priority and is accessing the critical section, N being a positive integer greater than or equal to 4;
    determining that a priority of the (N+1)th task is lower than the priority of the first task; and
    raising the priority of the (N+1)th task.

11. The method of claim 10, wherein the raising the priority of the (N+1)th task comprises raising the priority of the (N+1)th task to the priority of the first task.

12. A device comprising:
    one or more processors; and
    one or more memories storing computer readable instructions that, executable by the one or more processors, cause the one or more processors to perform acts comprising:
        determining that a first task is blocked due to failure to access a first critical section;
        raising a priority of a second task that shares the first critical section with the first task and is accessing the first critical section up to a priority of the first task, the first task having a higher priority than that of the second task and a third task, the second task having a higher priority than that of the third task;
        determining that there is the third task that shares a second critical section with the second task and is accessing the second critical section; and
        raising a priority of the third task up to the priority of the first task.

13. The device of claim 12, wherein the raising the priority of the second task comprises raising the priority of the second task to the priority of the first task.

14. The device of claim 12, wherein the raising the priority of the second task comprises raising the priority of the second task to the priority of the first task.

15. The device of claim 12, wherein the raising the priority of the second task comprises raising the priority of the second task to a priority only lower than the priority of the first task.

16. The device of claim 12, wherein the raising the priority of the second task comprises raising the priority of the second task to be higher than the priority of the third task.

17. The device of claim 12, wherein the raising the priority of the third task comprises raising the priority of the third task to the priority of the first task.

18. The device of claim 12, wherein the first critical section and the second critical section are the same critical section.

19. The device of claim 12, wherein the first critical section and the second critical section are different critical sections.

20. One or more memories storing computer readable instructions that, executable by one or more processors, cause the one or more processors to perform acts comprising:
    determining that a first task is blocked due to failure to access a first critical section in a multitask computing system, a priority of the first task being higher than a priority of a second task, the priority of the second task being higher than a priority of a third task;
    raising the priority of the second task that shares the first critical section with the first task and is accessing the first critical section up to the priority of the first task;
    determining that there is the third task that shares a second critical section with the second task and is accessing the second critical section; and
    raising the priority of the third task up to the priority of the first task.

* * * * *